United States Patent [19]

Ferrari

[11] Patent Number: 4,783,311
[45] Date of Patent: Nov. 8, 1988

[54] PELLET-CLAD INTERACTION RESISTANT NUCLEAR FUEL ELEMENT

[75] Inventor: Harry M. Ferrari, Edgewood, Pa.

[73] Assignee: Westinghouse Electric Corp., Pittsburgh, Pa.

[21] Appl. No.: 73,560

[22] Filed: Jul. 15, 1987

Related U.S. Application Data

[63] Continuation-in-part of Ser. No. 919,943, Oct. 17, 1986, abandoned.

[51] Int. Cl.$^4$ ............................................. G21C 3/20
[52] U.S. Cl. ..................................... 376/417; 376/415; 376/418; 376/419; 376/902
[58] Field of Search ............... 376/415, 416, 417, 418, 376/419, 902

[56] References Cited

U.S. PATENT DOCUMENTS 3,119,747  1/1964  Wallace et al.
3,427,222  2/1969  Biancheria et al.
3,925,151  12/1975  Klepfer.
3,928,130  12/1975  Pawlin et al.
4,146,431  3/1979  Tarasuk et al.
4,541,984  9/1985  Palmer .................................. 376/415

Primary Examiner—Charles T. Jordan
Assistant Examiner—Richard W. Wendtland

[57] ABSTRACT

Nuclear fuel elements are provided that are resistant to pellet-clad interaction. The closed end nuclear fuel elements comprise a zirconium or zirconium alloy tube that has a layer of lubricant, preferably graphite, on the inner surface thereof, and enriched uranium dioxide pellets that have a coating on the outer surface thereof of a thickness sufficient to absorb fission products. The coating on the pellets may be a burnable absorber or a material that has a relatively low neutron absorption compared to a burnable absorber. The combination of the layer on the tube and the coating on the pellets reduces both the stress level and the concentration of damaging fission products that would contact and react with the layer of lubricant about the inside surface of the tubular cladding and thus reduces conditions for pellet-clad interaction.

16 Claims, 3 Drawing Sheets

PELLET-CLAD INTERACTION RESISTANT NUCLEAR FUEL ELEMENT

CROSS REFERENCE TO RELATED APPLICATION

This application is a continuation-in-part of copending U.S. patent application Ser. No. 919,943, filed Oct. 17, 1986, now abandoned.

BACKGROUND OF THE INVENTION

1. Field of the Invention:

The present invention is to a nuclear fuel element for use in nuclear reactors which fuel element is resistant to pellet-clad interaction.

2. Description of the Prior Art:

Nuclear reactor systems for producing electrical energy provide heat for steam production, with the steam produced used for electrical energy production. In a nuclear reactor, nuclear fuel rods are present which preferably contain an enriched nuclear fuel such as pellets of uranium dioxide enriched in the U-235 isotope. Such nuclear fuel rods are metallic tubular shells, or cladding, which are hermetically sealed at their ends and contain the fuel pellets. Such cladding must maintain its integrity so as to prevent any leakage into or out of the shell of a pressurized water nuclear reactor or a boiling water nuclear reactor.

Nuclear fuel cladding is normally formed from zirconium or a zirconium alloy. During operation of a nuclear reactor, fissile materials are released from the fuel pellets. These released materials, which include volatile materials, cause a problem of stress corrosion and possible failure of the metallic tubular cladding. This phenomenon is generally described as "pellet-clad interaction" (PCI). The chemical reaction of the metallic tubing with high energy fissile materials such as iodine, cesium, cadmium, or other elements, coupled with cladding operating stresses can produce stress corrosion cracking of the metallic cladding or tubing and resultant penetration of the wall of the tube. In order to prevent pellet-clad interaction, utilities often operate a nuclear reactor plant in such a conservative manner as to lose about three to five percent in plant availability.

Attempts have been made to prevent pellet-clad interaction, such as by coating the inner surface of the tubing wall with various protective coatings, or coextruding a pure zirconium barrier on the inner portion of a zirconium alloy tubular wall. In U.S. Pat. No. 3,925,151, for example, it is suggested to dispose in the tubular cladding, between the cladding wall and the fuel pellets, a metal liner, such as a liner of zirconium or an alloy of zirconium. A layer of a high lubricity material such as graphite or molybdenum disulfide is disposed between the cladding and the liner, which acts as an interface between the liner and the cladding and reduces localized stresses on the cladding due to fuel expansion and cracking of the fuel. The use of such a high-purity, low-oxygen zirconium liner in a cladding, while useful, results in high costs associated with such fuel elements.

It has also been proposed to provide a zirconium cladding that has a graphite layer on the inner surface thereof between the cladding wall and the fuel. Such efforts have been addressed to preventing pellet-clad interaction in natural uranium CANDU reactors In U.S. Pat. No. 4,146,431, for example, a nuclear fuel element containing non-enriched uranium is described wherein a non-bonding lining layer is interposed between the pellets and the cladding, which layer is selected from graphite, siloxane and silicon. The non-bonding layer may be applied to the interior surface of the cladding or the same may be applied to the surface of the non-enriched uranium dioxide fuel pellets.

U.S. Pat. No. 4,146,431 also refers to U.S. Pat. No. 3,119,747 which discloses use of a high temperature lubricant such as graphite between the fuel body and the fuel rod sheath, in connection with an elongated fuel body having a gradual end taper. Alternatively or additionally, a thin coating, for example less than 0.005 inch thick, of a high temperature stable lubricant such as molybdenum disulfide can be applied to the outer surface of the fuel body and/or the inner surface of the container.

Unfortunately, such graphite layers as taught in U.S. Pat. Nos. 4,146,431 and 3,119,747, although extremely effective, lose their effectiveness with burnup and are essentially ineffective above 10,000 to 15,000 megawatt days/metric tons of uranium (MWD/MTU) of fuel burnup. Fission products from the fuel react chemically with the graphite and cause the graphite to lose its lubricating properties. The graphite is attractive, however, in that it is relatively inexpensive to put a graphite coating on the inner surface of the cladding.

The coating of nuclear fuel pellets with materials other than lubricants has also been proposed for various reasons. In U.S. Pat. No. 3,427,222, for example, assigned to the assignee of the present invention, fuel pellets are described havng a fusion-bonded coating thereon which is composed of a boron-containing material that functions as a burnable absorber.

It is an object of the present invention to provide a nuclear fuel element containing enriched uranium dioxide fuel which is immune to pellet-clad interaction fuel failures.

It is another object of the present invention to provide a nuclear fuel element containing enriched uranium dioxide fuel in which both conditions required for pellet-clad interaction, the damaging chemical species and high-clad stresses, are reduced so as to provide an improved life of the nuclear fuel element.

SUMMARY OF THE INVENTION

A nuclear fuel element which is resistant to pellet-clad interaction is comprised of a zirconium or zirconium alloy tube which has a coating of lubricant, preferably graphite, on the interior surface thereof, and which contains a plurality of enriched uranium dioxide nuclear fuel pellets that have a layer of sufficient thickness to absorb fission products, which coating is thermally and chemically compatible with the enriched uranium dioxide fuel. The coating about the circumferential outer surface of the pellets may be a burnable absorber, such as zirconium boride or gadolinium oxide; a metal such as zirconium or chromium; a metallic oxide, such as zirconium dioxide; or graphite. The lubricant layer about the inside surface of the cladding tube is between about 4–50 micrometers thick and the coating about the circumferential outer surface of the pellet is between about 10–200 micrometers thick.

The coating on the pellets absorbs damaging fission products while the lubricant layer on the cladding inner surface provides lubricity, such that the stress level and concentration of damaging chemical fission products are both reduced so as to provide a nuclear fuel element resistant to pellet-clad interaction.

DESCRIPTION OF THE PREFERRED EMBODIMENTS

The present invention provides an improved nuclear fuel rod that is resistant to pellet-clad interaction fuel failures. The fuel rod is one that contains an enriched uranium dioxide nuclear fuel such as uranium dioxide enriched in the U-235 isotope. With such an enriched nuclear fuel, the problem of pellet-clad interaction is more severe due to the longer burnup time for such a fuel and the resultant contact of the fission products with the cladding interior wall. By providing a layer of a specific lubricant, preferably graphite, of a sufficient thickness on the inner wall of the cladding and a specific coating on the fuel pellet outer surface, according to the present invention, pellet-clad interaction is prevented.

Figure 2:
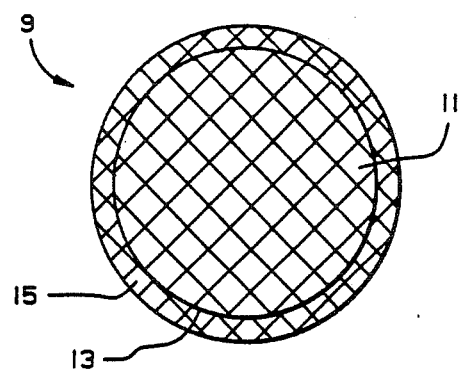
FIG. 2 shows a transverse cross-section through a nuclear pellet used in the nuclear fuel element of the present invention.
Figure 1:
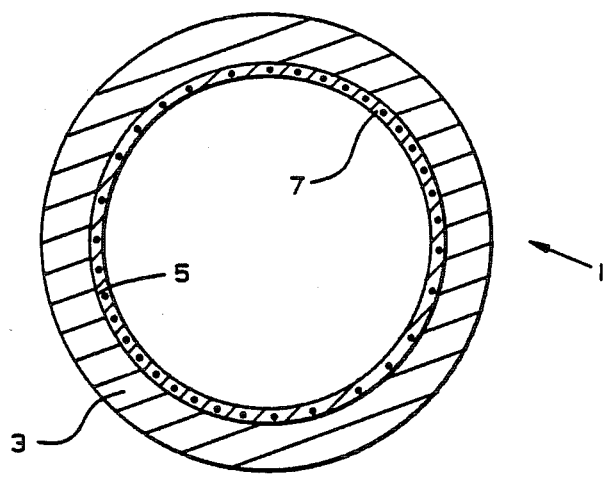
FIG. 1 shows a transverse cross-section through a tubular cladding used in the nuclear fuel element of the present invention.

Referring now to FIGS. 1 and 2, components of the present nuclear fuel element include a metallic cladding 1 that has a lubricant layer thereon, preferably of graphite, and an enriched nuclear fuel 9 that has a coating about the outer surface thereof. The metallic tubular cladding 1 comprises a tubular element 3 formed from zirconium or a zirconium alloy which contains less than about 5 percent by weight of alloying elements, usable in nuclear reactors. Such zirconium alloys contain elements which increase the mechanical properties of zirconium metal and/or the corrosion resistance of zirconium metal. The elements that are used in the formation of such alloys include niobium, oxygen, tin, iron, chromium, nickel, molybdenum, copper, vanadium and the like. Especially useful alloys are a zirconium alloy containing about 2.5 percent niobium and the zirconium alloys known as Zircaloy-2 and Zircaloy-4. Zircaloy-2 contains, by weight, about 1.2–1.7 percent tin; 0.07–0.20 percent iron; 0.05–0.15 percent chromium; and about 0.03–0.08 percent nickel; the balance being essentially zirconium. Zircaloy-4 contains, by weight, about 1.2–1.7 percent tin; 0.12–0.18 percent iron, and 0.05–0.15 percent chromium, the balance being essentially zirconium.

On the inner surface 5 of the metallic tubular cladding 3 there is provided a layer of lubricant 7, preferably graphite. The preferred thickness of this layer is between 4–50 micrometers. A layer of graphite of about 4 micrometers can be applied by contacting the surface of the tube with a suspension of graphite in isopropyl alcohol and allowing the alcohol to evaporate. A thicker layer of graphite would exhibit superior lubrication properties but would be more difficult to apply. Uniform application of a layer thinner than about 4 micrometers would be difficult and could leave portions of the inner surface 5 of metallic tubular cladding 3 without sufficient lubricant.

The nuclear fuel pellets 9 comprise pellets of substantially cylindrical formed shapes 11 of uranium dioxide enriched with the U-235 isotope having an outer circumferential surface 13 upon which there is provided a coating 15 of a material that will absorb fission products and which is sufficiently chemically and thermally compatible with the enriched uranium dioxide so as to prevent flaking off of the coating.

The coating 15 on the fuel pellets 11 can be of a variety of materials, such as burnable absorbers or materials having a relatively low neutron absorption as compared to burnable absorbers, provided that the same is of a sufficient thickness so as to absorb most of the recoil fission products resulting from uranium fission, and is chemically and thermally compatible with enriched uranium dioxide. As examples of burnable absorber types of coatings, the coating could comprise zirconium diboride ($ZrB_2$), boron carbide ($B_4C$), boron nitride (BN), gadolinium oxide ($Gd_2O_3$), or a boron-containing burnable absorber glazed composition, such as those described in U.S. Pat. No. 3,427,222, the contents of which patent are incorporated by reference herein. The materials which have relatively low neutron absorption compared with the burnable absorbers must be chemically and thermally compatible with the enriched uranium dioxide fuel while being capable of absorbing the fission products from the fuel. By relatively low neutron absorption, it is meant that such materials would have a neutron absorption of less than 10 percent of the neutron absorption of a burnable absorber. As is known, burnable absorbers generally have a microscopic neutron absorption cross-section of above about 750 barns (neutrons at 2200 meters per second). As examples of relatively low neutron absorption materials, the coating could comprise a metallic oxide such as zirconium dioxide ($ZrO_2$) or alumina ($Al_2O_3$); a metal such as copper, nickel, chromium, or the like; or the coating can comprise graphite.

The thickness of coating 15 must be sufficient to absorb the recoil fission products. However, if the coating is made thicker than required, it occupies space that could be occupied by fuel. The capability of a coating material to absorb the fission products is generally related to the density of the material with more dense materials being more effective at stopping the fission products than less dense materials. For the variety of materials contemplated for use as coating 15 on the fuel pellets 11, the average minimum coating thickness required for absorption of the fission products is expected to be about 10 micrometers. The burnable absorber types of coatings, such as ZrB2, B4C, BN, Gd2O3, and boron-containing burnable absorber glazed composition, are generally more dense than the relatively low neutron absorption materials. Of the low neutron absorption materials useful as coating 15, graphite and metallic oxies, such as ZrO2, Al2O3, are generally less dense than useful metals, for example, zirconium, copper, nickel, chromium, or the like. Therefore, the neutron absorber materials require the thinnest coating for complete absorption of the fission products while metal coatings must be somewhat thicker to achieve the same results and complete absorption by metallic oxides and graphite requires an even thicker coating.

While an average minimum thickness of coating 15 is 10 micrometers for the variety of materials contemplated for use as coating 15, the coating may be up to 200 micrometers thick. In order to completely absorb fission products while maximizing space useful for fuel, the preferred thickness range for coating 15 is 15 to 25 micrometers.

Figure 3:
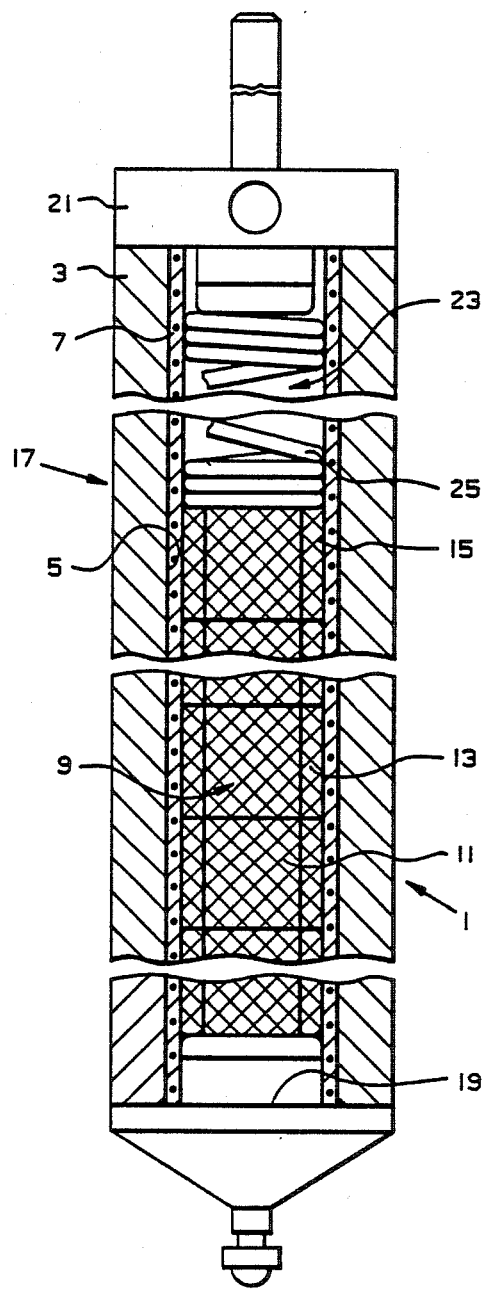
FIG. 3 shows a schematic representation of a partial cross-section through a nuclear fuel element of the present invention.

An assembled nuclear fuel element 17, in accordance with the present invention, is illustrated in FIG. 3. The nuclear fuel element 17 comprises the metallic tubular cladding 1 formed from a tubular element 3 of zirconium or a zirconium alloy having the layer 7 of a lubricant, preferably graphite, on the inner surface 5 thereof, which tubular element contains a plurality of enriched uranium dioxide fuel pellets 9 of substantially cylindrical formed shapes 11 having the coating 15 on the outer circumferential surface 13 thereof. The coated fuel pellets 9 are retained in the metallic tubular cladding 1 by a bottom end plug 19, formed from zirconium or zirconium alloy, which has previously been welded to the metallic tubular cladding, and a top end plug 21, also of zirconium or a zirconium alloy. A void space or plenum 23 is provided between the uppermost nuclear fuel pellet and the top end cap, with a brazing means such as a spring 25 inserted therein to restrain the coated nuclear fuel pellets 9 within the metallic tubular cladding 1. Clearance spaces 27 (FIG. 4) are left between the coated nuclear fuel pellets 9 and the graphite layer 7 on the inner surface of the tubular element 3. The clearance spaces and plenum are filled with a high purity, inert atmosphere having high thermal conductivity, such as high purity helium.

Figure 4:
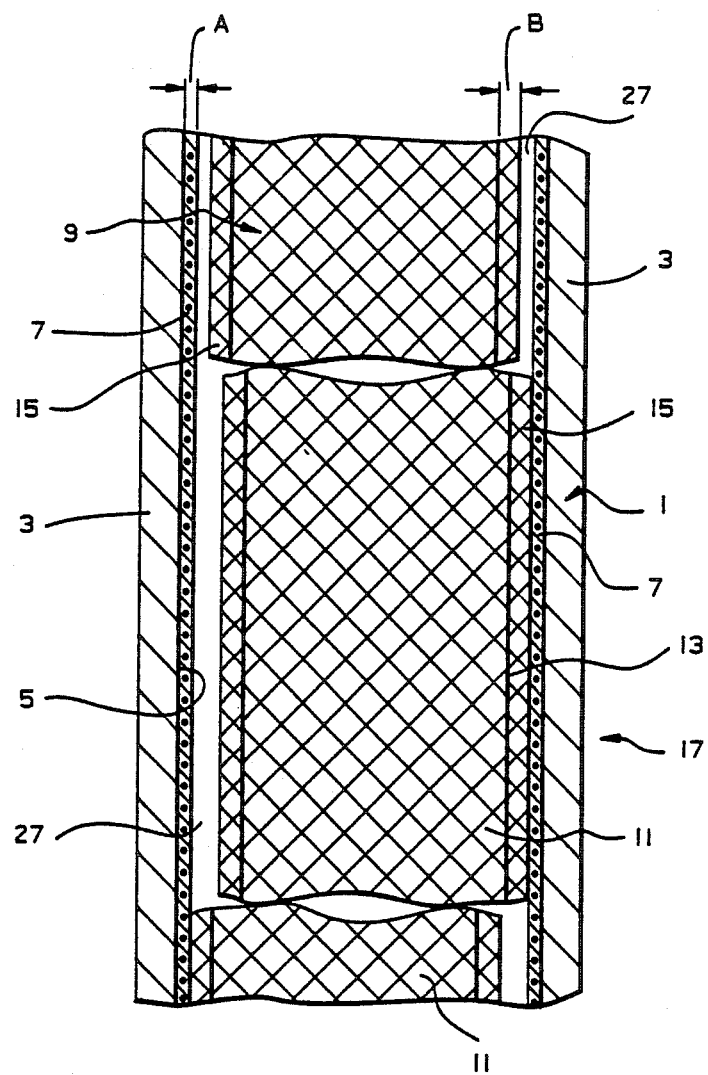
FIG. 4 shows an enlarged cross-sectional view of the fuel element illustrated in FIG. 3 exposing a diametrical, longitudinal plane of the same.

In the preferred embodiment illustrated in FIG. 4, the layer of graphite 7 on the inner surface 5 of the tubular element 3 has a thickness A, preferably of at least 4 micrometers, while the coating 15 about the circumferential outer surface 13 of the enriched fuel pellets 11 has a thickness B of at least 10 micrometers and preferably between about 15 to 25 micrometers. Since the coating 15 on the enriched nuclar fuel pellets absorbs the damaging fission products, the graphite layer 7 on the metallic tubular cladding will not be absorbing the fission products and, therefore, will retain most of its desirable lubricating properties. Thus, the coating 15 on the enriched nuclear fuel pellets will absorb the damaging fission products which provide the chemical species which contribute to pellet-clad interaction stress-corrosion cracking and the graphite layer 7 on the inner surface of the metallic tubular cladding will provide the lubricity which will prevent high clad stresses on the cladding. Thus, the present invention reduces both conditions required for pellet-clad interaction/stress-corrosion cracking; the stress level and the concentration of damaging chemical fission products.

What is claimed is:

1. A nuclear fuel element comprising: a metallic tubular cladding composed of a metal selected from zirconium or a zirconium alloy, containing a plurality of nuclear fuel pellets and having end sealing means for hermetically sealing said nuclear fuel pellets within said metallic tubular cladding, wherein a layer of a lubricant is provided on the inner surface of said metallic tubular cladding to provide the lubricity which will prevent high clad stresses on the cladding, and said plurality of fuel pellets are comprised of enriched uranium and have on the circumferential surface thereof a coating of a coating material of a thickness sufficient to absorb fission products emanating from said enriched uranium dioxide, and sufficiently chemically and thermally compatible with said enriched uranium dioxide to prevent flaking off of said coating, portions of said coating contacting portions of said layer, absorption of the fission products by said coating acting to prevent reaction between the fission products and said lubricant layer to extend the effectiveness of said lubricant layer to a longer burnup time.

2. A nuclear fuel element as defined in claim 1 wherein said lubricant consists of graphite.

3. A nuclear fuel element as defined in claim 2 wherein said layer of graphite is between 4–50 micrometers in thickness.

4. A nuclear fuel element as defined in claim 1 wherein said coating is between 10–200 micrometers in thickness.

5. A nuclear fuel element as defined in claim 3 wherein said coating is between 10–200 micrometers in thickness.

6. A nuclear fuel element as defined in claim 1 wherein said metallic tubular cladding is a zirconium alloy.

7. A nuclear fuel element as defined in claim 6 wherein said zirconium alloy is selected from Zircaloy-2 and Zircaloy-4.

8. A nuclear fuel element as defined in claim 1 wherein the coating on the circumferential surface of said pellets is a burnable absorber selected from the group consisting of zirconium diboride, boron carbide, boron nitride, gadolinium oxide, and a burnable absorber glazed composition.

9. A nuclear fuel element as defined in claim 8 wherein said lubricant consists of graphite.

10. A nuclear fuel element as define in claim 1 wherein the coating on the circumferential surface of said pellets consists of a material which has a relatively low neutron absorption compared with a burnable absorber, said material being selected from the group consisting of metallic oxides, metals, and graphite.

11. A nuclear fuel element as defined in claim 10 wherein said material consists of a metallic oxide, said metallic oxide being selected from the group consisting of zirconium dioxide and alumina.

12. A nuclear fuel element as defined in claim 10 wherein said material consists of a metal, said metal being selected from the group consisting of zirconium, nickel, chromium and copper.

13. A nuclear fuel element comprising: a metallic tubular cladding composed of a metal selected from zirconium or a zirconium alloy, containing a plurality of cylindrical nuclear fuel pellets and having end sealing means for hermetically sealing said nuclear fuel pellets within said metallic tubular cladding, wherein a layer of graphite of between about 4–50 micrometers is provided on the inner surface of said metallic tubular cladding to provide the lubricity which will prevent high clad stresses on the cladding, and said plurality of cylindrical pellets are comprised of enriched uranium dioxide and have on the circumferential surface thereof a coating of between about 10–200 micrometers thick of a coating material selected from the group consisting of a burnable absorber and a material which has a relatively low neutron absorption compared with a burnable absorber, said coating being adapted to absorb fission products from said enriched uranium dioxide, said coating being sufficiently chemically and thermally compatible with said enriched uranium dioxide to prevent flaking off of said coating, portions of said coating contacting portions of said layer, absorption of the fission products by said coating acting to prevent reaction between the fission products and said graphite layer to extend the effectiveness of said graphite layer to a longer burnup time.

14. A nuclear fuel element as defined in claim 13 wherein said coating material is a burnable absorber selected from the group consisting of zirconium diboride, boron carbide, boron nitride, gadolinium oxide, and a burnable absorber glazed composition.

15. A nuclear fuel element as defined in claim 13 wherein said coating is a metal, said metal coating having a relatively low neutron absorption compared to a burnable absorber, said metal coating being selected from the group consisting of zirconium, nickel, chromium and copper.

16. A nuclear fuel element as defined in claim 13 wherein said coating is a metallic oxide, said metallic oxide coating having a relatively low neutron absorption compared to a burnable absorber, said metallic oxide coating being selected from the group consisting of zirconium dioxide and alumina.

* * * * *